US012354322B1

(12) United States Patent
Wang et al.

(10) Patent No.: US 12,354,322 B1
(45) Date of Patent: Jul. 8, 2025

(54) MULTIMODAL IMAGE MATCHING METHOD AND SYSTEM, TERMINAL DEVICE, AND STORAGE MEDIUM

(71) Applicant: SUN YAT-SEN UNIVERSITY, Guangdong (CN)

(72) Inventors: Qingsong Wang, Guangdong (CN); Yijun Liu, Guangdong (CN); Haifeng Huang, Guangdong (CN); Tao Lai, Guangdong (CN)

(73) Assignee: SUN YAT-SEN UNIVERSITY, Guangzhou (CN)

( * ) Notice: Subject to any disclaimer, the term of this patent is extended or adjusted under 35 U.S.C. 154(b) by 0 days.

(21) Appl. No.: 18/954,565

(22) Filed: Nov. 21, 2024

Related U.S. Application Data

(63) Continuation-in-part of application No. PCT/CN2024/103035, filed on Jul. 2, 2024.

(30) Foreign Application Priority Data

Jan. 10, 2024 (CN) ......................... 202410034059.6

(51) Int. Cl.
 *G06V 10/75* (2022.01)
 *G06T 7/174* (2017.01)
 *G06V 10/32* (2022.01)

(52) U.S. Cl.
 CPC ............ *G06V 10/757* (2022.01); *G06T 7/174* (2017.01); *G06V 10/32* (2022.01); *G06T 2207/10044* (2013.01)

(58) Field of Classification Search
 CPC .................. G06V 10/757; G06T 7/174; G06T 2207/10044
 See application file for complete search history.

(56) References Cited

U.S. PATENT DOCUMENTS

| | | | | |
|---|---|---|---|---|
| 2020/0357143 | A1* | 11/2020 | Chiu | G06F 18/253 |
| 2023/0184927 | A1* | 6/2023 | Chen | G06V 10/7715 |
| | | | | 342/25 R |
| 2025/0086964 | A1* | 3/2025 | Guerrero Del Pozo | |
| | | | | G06V 10/82 |

FOREIGN PATENT DOCUMENTS

| | | | |
|---|---|---|---|
| CN | 113808180 A | * | 12/2021 |
| CN | 114092531 A | | 2/2022 |

(Continued)

OTHER PUBLICATIONS

S. Zhang et al., "Multilevel Attention Siamese Network for Keypoint Detection in Optical and SAR Images," in IEEE Transactions on Geoscience and Remote Sensing, vol. 61, pp. 1-17, 2023, Art No. 5404617, doi: 10.1109/TGRS.2023.3293143 (Year: 2023).*

(Continued)

*Primary Examiner* — Michael Robert Cammarata

(57) ABSTRACT

Provided are a multimodal image matching method and system, terminal device, and storage medium. The method includes: performing self-supervised feature extraction on an optical image and a synthetic aperture radar (SAR) image to obtain a repetitive feature point between the optical image and the SAR image; segmenting the optical image and the SAR image into a first image block sequence based on the repetitive feature point, and performing feature extraction on the first image block sequence through a dual-branch network to obtain feature description vectors of the optical image and the SAR image respectively, where the dual-branch network includes a first branch network for extracting a global feature and a second branch network for extracting a local feature; and performing feature matching on the optical image and the SAR image based on the feature description vectors to obtain a matching point pair between the optical image and the SAR image.

20 Claims, 8 Drawing Sheets

(56) References Cited

FOREIGN PATENT DOCUMENTS

| CN | 114612698 | A |   | 6/2022  |
|----|-----------|---|---|---------|
| CN | 116310634 | A | * | 6/2023  |
| CN | 116594010 | A | * | 8/2023  |
| CN | 116778198 | A | * | 9/2023  |
| CN | 117250608 | A | * | 12/2023 |
| CN | 117314811 | A | * | 12/2023 |
| CN | 117495690 | A | * | 2/2024  |
| CN | 119131374 | A | * | 12/2024 |
| EP | 3113076   | A1 | * | 1/2017 |

OTHER PUBLICATIONS

Y. Liu, M. Lin, Y. Mo and Q. Wang, "SAR-Optical Image Matching Using Self-Supervised Detection and a Transformer-CNN-Based Network," in IEEE Geoscience and Remote Sensing Letters, vol. 21, pp. 1-5, Jan. 18, 2024, Art No. 4002505, doi: 10.1109/LGRS.2024.3355472 (Year: 2024).*

H. Zhang et al., "Optical and SAR Image Dense Registration Using a Robust Deep Optical Flow Framework," in IEEE Journal of Selected Topics in Applied Earth Observations and Remote Sensing, vol. 16, pp. 1269-1294, 2023, doi: 10.1109/JSTARS.2023.3235535.*

C. An, et al., "Robust Self-supervised Correspondence Learning for SAR-optical Image Matching," 2022 2nd Int'l Conf. on Computer Science, Electronic Information Engineering and Intelligent Control Technology (CEI), Nanjing, China, 2022, pp. 49-53, doi: 10.1109/CEI57409.2022.9950181. (Year: 2022).*

X. Li et al., "SARPointNet: An Automated Feature Learning Framework for Spaceborne SAR Image Registration," in IEEE Journal of Selected Topics in Applied Earth Observations and Remote Sensing, vol. 15, pp. 6371-6381, 2022, doi: 10.1109/JSTARS.2022.3196383. (Year: 2022).*

Jiayuan Li et al., RIFT: Multi-modal Image Matching Based on Radiation-variation Insensitive Feature Transform, IEEE Transactions on Image Processing, 2019, pp. 1-14, vol. 29.

Yuanxin Ye et al., Fast and Robust Matching for Multimodal Remote Sensing Image Registration, IEEE Transactions on Geoscience and Remote Sensing, Nov. 2019, pp. 9059-9070, vol. 57, No. 11.

Wei Wu et al., A Siamese Template Matching Method for SAR and Optical Image, IEEE Geoscience and Remote Sensing Letters, 2022, pp. 1-5, vol. 19.

Yun Liao et al., Feature Matching and Position Matching Between Optical and SAR With Local Deep Feature Descriptor, IEEE Journal of Selected Topics in Applied Earth Observations and Remote Sensing, 2022, pp. 448-462, vol. 15.

Mihai Dusmanu et al., D2-Net: A Trainable CNN for Joint Description and Detection of Local Features, IEEE/CVF Conference on Computer Vision and Pattern Recognition (CVPR), 2019, pp. 8092-8101.

He Li et al., Remote Sensing Image Fusion with Dual-branch Attention Network, Computer Science, Nov. 2023, pp. 1-7, vol. 50, No. 11A.

* cited by examiner

MULTIMODAL IMAGE MATCHING METHOD AND SYSTEM, TERMINAL DEVICE, AND STORAGE MEDIUM

CROSS REFERENCE TO RELATED APPLICATIONS

The present application is a Continuation-In-Part Application of PCT Application No. PCT/CN2024/103035 filed on Jul. 2, 2024, which claims the benefit of Chinese Patent Application No. 202410034059.6 filed on Jan. 10, 2024. All the above are hereby incorporated by reference in their entirety.

TECHNICAL FIELD

The present disclosure relates to the technical field of deep learning and images, and in particular, to a multimodal image matching method and system, a terminal device, and a storage medium.

BACKGROUND

Matching between a synthetic aperture radar (SAR) image and an optical image is a key step in multimodal image information fusion, and image matching methods can be classified into feature-based and region-based methods.

The feature-based method includes classic methods such as scale-variant feature transform (SIFT) and SAR-SIFT, which are widely used. Li (J. Li, Q. Hu and M. Ai, "RIFT: Multi-Modal Image Matching Based on Radiation-Variation Insensitive Feature Transform," in IEEE Transactions on Image Processing, vol. 29, pp. 3296-3310, 2020, doi: 10.1109/TIP.2019.2959244) proposed a phase congruency method, that is, radiation-variation insensitive feature transform (RIFT) to address matching problems caused by a nonlinear radiation distortion and a significant image intensity difference, which between the SAR image and the optical image. The RIFT utilizes phase congruency instead of pixel intensity for feature extraction. The phase congruency is utilized to detect a feature based on a frequency domain and can effectively resist a nonlinear radiation difference between images. Similarly, in the Locally Normalized Image for Rotation Invariant Multimodal Feature Matching (LINFT) method, it is proposed that a histogram of oriented gradient (HOG) feature has robustness for an intensity change, and can achieve a good result when applied to a task of matching the optical image and the SAR image.

The region-based method utilizes grayscale information of an image to measure a level of similarity between images. Common similarity metrics include normalized cross correlation (NCC), mutual information (MI), sum of squared difference (SSD), and the like. In order to cope with a nonlinear radiation distortion between heterologous images, Ye proposed a new similarity metric, namely channel feature of oriented gradient (CFOG), based on a structural similarity between the images. The idea of the CFOG is derived from the HOG feature to perform pixel-by-pixel feature representation on the image by calculating an HOG of a pixel. Moreover, the CFOG also transforms a structural feature into frequency space and utilizes fast Fourier transform to accelerate matching.

In order to obtain a deep feature, many researchers have adopted a deep neural network for feature extraction and description. Wu (W. Wu, Y Xian, J. Su and L. Ren, "A Siamese Template Matching Method for SAR and Optical Image," in IEEE Geoscience and Remote Sensing Letters, vol. 19, pp. 1-5, 2022, Art no. 4017905, doi: 10.1109/LGRS.2021.3108579.) proposed to use a convolutional neural network (CNN) to generate a feature map with a correlation between the heterologous images pixel by pixel, and then obtain a matching relationship through template matching. A learning-based method does not need to manually design a complex descriptor. Liao et al. (Y Liao et al., "Feature Matching and Position Matching Between Optical and SAR With Local Deep Feature Descriptor," in IEEE Journal of Selected Topics in Applied Earth Observations and Remote Sensing, vol. 15, pp. 448-462, 2022, doi: 10.1109/JSTARS.2021.3134676.) designed a deep convolutional network MatchosNet, which includes a dense block and a cross-stage local network, to generate a depth descriptor for matching the SAR image and the optical image. In addition, Mihai Dusmanu (M. Dusmanu et al., "D2-Net: A Trainable CNN for Joint Description and Detection of Local Features," 2019 IEEE/CVF Conference on Computer Vision and Pattern Recognition (CVPR), Long Beach, CA, USA, 2019, pp. 8084-8093, doi: 10.1109/CVPR.2019.00828.) proposed a method for simultaneously performing feature detection and extracting a dense feature descriptor using a single CNN. Feature point detection is placed in a later stage of processing to obtain a more stable keypoint. These methods all obtain related advanced features between the heterologous images through a deep network.

However, all the above methods have their own drawbacks. The feature-based method, such as the SIFT and the SAR-SIFT, typically relies on image gradient information for feature extraction and description, and has poor performance in heterologous matching between the SAR image and the optical image. The RIFT, the LINFT, and other methods that adapt to the SAR image and the optical image can counteract a nonlinear intensity difference to some extent, but they cannot capture a deep and complex feature representation shared by the heterologous images, and rely on a shallow feature (such as corner and edge points) for matching. This method is susceptible to noise interference.

There is a nonlinear radiation distortion and a significant pixel intensity difference between the SAR image and the optical image. The region-based method relies on the grayscale information of the image, making it unsuitable and susceptible to an image distortion. The region-based method requires a large amount of computation, which limits its application in multimodal image matching.

At present, the method for obtaining the related advanced features between the heterologous images by using the neural network generally samples a single deep CNN for feature extraction and description, which has poor interpretability and is difficult to mine global feature information of the heterologous images. In addition, these methods cannot obtain a repetitive feature point, increasing indistinguishability in matching a positive sample and a similar negative sample.

SUMMARY

Technical problems to be solved by the present disclosure are that a feature-based method cannot obtain a deeper feature for matching between heterologous images; a region-based method is sensitive to grayscale transformation, easily affected by an image distortion, and requires a large amount of computation; and a neural network-based heterologous image matching method generally uses a single CNN for feature extraction and ignores extraction of a repetitive feature point. To solve the above technical problems, the present disclosure provides a multimodal image matching method and system, a terminal device, and a storage medium.

According to a first aspect, an embodiment of the present disclosure provides a multimodal image matching method, including:

performing self-supervised feature extraction on an optical image and a SAR image to obtain a repetitive feature point between the optical image and the SAR image, so as to improve robustness and consistency of feature points between multimodal images;

segmenting the optical image and the SAR image into a first image block sequence based on the repetitive feature point, and performing feature extraction on the first image block sequence through a dual-branch network to obtain feature description vectors of the optical image and the SAR image respectively, where the dual-branch network includes a first branch network for extracting a global feature and a second branch network for extracting a local feature, whereby a traditional CNN can obtain global feature information of the image; and performing feature matching on the optical image and the SAR image based on the feature description vectors to obtain a matching point pair between the optical image and the SAR image, whereby matching precision is significantly improved.

Preferably, before the performing self-supervised feature extraction on an optical image and a SAR image, the multimodal image matching method includes:

converting the optical image and the SAR image into a normalized image by using a local normalization filter.

Preferably, the performing self-supervised feature extraction on an optical image and a SAR image to obtain a repetitive feature point between the optical image and the SAR image includes:

combing the optical image and the SAR image into a SAR-optical image pair;

performing self-supervised learning on the SAR-optical image pair to obtain a keypoint score map; and constructing a feature point extraction loss function based on the keypoint score map, and optimizing the self-supervised learning by using the feature point extraction loss function to learn the repetitive feature point between the optical image and the SAR image.

Preferably, the constructing a feature point extraction loss function based on the keypoint score map includes:

dividing the keypoint score map into a second image block sequence, where the second image block sequence includes a SAR image block sequence and an optical image block sequence;

constructing the feature point extraction loss function based on the second image block sequence, where the feature point extraction loss function includes a first loss function, a second loss function, and a third loss function, where the first loss function is represented by a following formula:

$$L_1(I_s, I_o, U) = 1 - \frac{1}{m}\sum_{i=1}^{m} \cos im(\text{Score}_o(i), \text{Score}_s U(i))$$

where $I_S$ represents the SAR image, $I_o$ represents the optical image, U represents affine transformation, $\text{Score}_o(i)$ represents an $i^{th}$ image block of the optical image block sequence, $\text{Score}_s U(i)$ represents an $i^{th}$ image block of the SAR image block sequence, and m represents a quantity of image blocks in the second image block sequence;

the second loss function is represented by a following formula:

$$L_2(I) = 1 - \frac{1}{m}\sum_{i=1}^{m}(\max\ \text{Score}(i) - meanScore(i))$$

where I represents the SAR-optical image pair, and Score (i) represents an $i^{th}$ image block of the second image block sequence; and the third loss function is represented by a following formula:

$$L_3 = 1 - [AP_{ij}\text{Score}_{ij} + \gamma(1 - \text{Score}_{ij})]$$

where $AP_{ij}$ represents average precision (AP) corresponding to a pixel at an (i, j) position in the SAR-optical image pair, $\text{Score}_{ij}$ represents a score corresponding to the pixel at the (i, j) position in the SAR-optical image pair, and $\gamma$ represents a hyperparameter; and the AP represents a degree of similarity between feature description vectors of pixels at corresponding positions in the SAR-optical image pair; and performing weighted summation on the first loss function, the second loss function, and the third loss function to obtain the feature point extraction loss function.

Preferably, the dual-branch network further includes a convolutional layer for extracting a shallow feature; and the segmenting the optical image and the SAR image into a first image block sequence based on the repetitive feature point, and performing feature extraction on the first image block sequence through a dual-branch network to obtain feature description vectors of the optical image and the SAR image respectively includes:

segmenting the optical image and the SAR image into the first image block sequence by taking the repetitive feature point as a center;

inputting the first image block sequence into the convolutional layer to obtain a shallow feature of the first image block sequence;

separately inputting the shallow feature into the first branch network and the second branch network to obtain a global feature and a local feature of the first image block sequence; and performing concatenation and convolution on the global feature and the local feature to obtain a feature description vector of the first image block sequence.

Preferably, the first branch network includes a lite-transformer, a full connection layer, and a normalization layer, and the second branch network includes a first Cross Stage Partial (CSP) module, a connection layer, and a second CSP module.

Preferably, the performing feature matching on the optical image and the SAR image based on the feature description vectors to obtain a matching point pair between the optical image and the SAR image includes:

performing the feature matching on the optical image and the SAR image by using a nearest neighbor (NN) search method, to obtain an initial matching point pair between the optical image and the SAR image; and purifying the initial matching point pair by means of random sample consensus (RANSAC) to obtain a target matching point pair between the optical image and the SAR image.

According to a second aspect, an embodiment of the present disclosure provides a multimodal image matching system, including:
- a feature point extraction module configured to perform self-supervised feature extraction on an optical image and a SAR image to obtain a repetitive feature point between the optical image and the SAR image;
- a feature description module configured to segment the optical image and the SAR image into a first image block sequence based on the repetitive feature point, and perform feature extraction on the first image block sequence through a dual-branch network to obtain feature description vectors of the optical image and the SAR image respectively, where the dual-branch network includes a first branch network for extracting a global feature and a second branch network for extracting a local feature; and
- a feature matching module configured to perform feature matching on the optical image and the SAR image based on the feature description vectors to obtain a matching point pair between the optical image and the SAR image.

According to a third aspect, an embodiment of the present disclosure provides a terminal device, including a processor, a memory, and a computer program stored in the memory and configured to be executed by the processor, where the processor executes the computer program to implement the above multimodal image matching method.

According to a fourth aspect, an embodiment of the present disclosure provides a computer-readable storage medium, where the computer-readable storage medium includes a computer program, and the computer program is run to control a device at which the computer-readable storage medium is located to implement the above multimodal image matching method.

The embodiments of the present disclosure provide a multimodal image matching method and system, a terminal device, and a storage medium. Compared with the prior art, the present disclosure has the following beneficial effects: A neural network is used to autonomously learn a region with strong matching between a SAR image and an optical image as a feature point. This has more advantages in extracting a repetitive feature point from heterologous images compared with a traditional geometric operator, effectively improving matching precision. A dual-branch network composed of a transformer-CNN joint framework is used to extract richer deep features shared by the heterologous SAR and optical images. This achieves a stronger anti-interference capability and better robustness compared with a traditional feature extraction method and a CNN-based method. A description then detection two-stage training method is adopted to link a feature detection module and a feature description module that are mutually isolated in a traditional feature-based matching method, whereby a matching relationship between the images constrains selection of the feature point to obtain a feature point more beneficial for matching.

DETAILED DESCRIPTION

The specific implementations of the present disclosure are described in more detail below with reference to the accompanying drawings and embodiments. The following embodiments are intended to illustrate the present disclosure, but not to limit the scope of the present disclosure.

Figure 1:
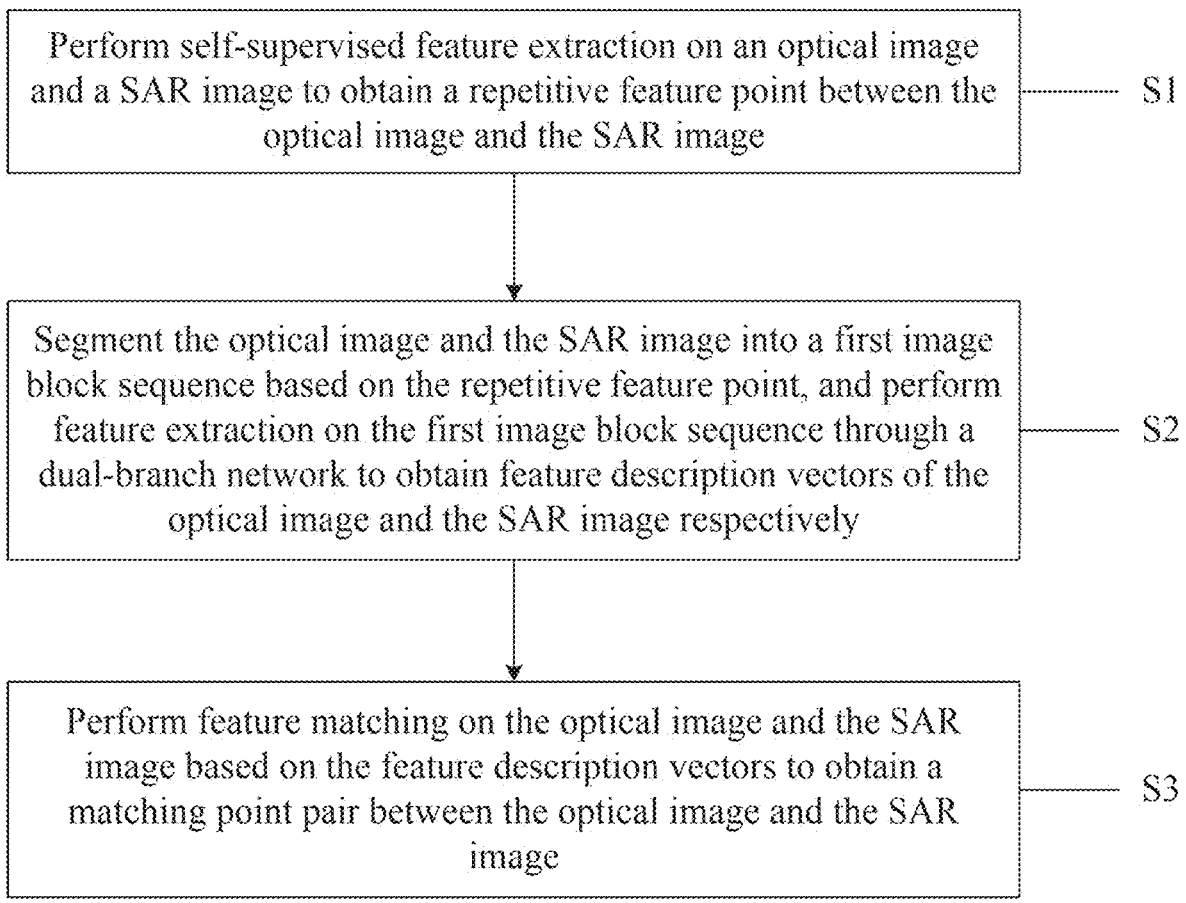
FIG. 1 is a schematic flowchart of a multimodal image matching method according to an embodiment of the present disclosure.

As shown in FIG. 1, an embodiment of the present disclosure provides a multimodal image matching method for an optical image and a SAR image, including the following steps:

S1: Perform self-supervised feature extraction on an optical image and a SAR image to obtain a repetitive feature point between the optical image and the SAR image.

In a feature-based heterologous image matching task, repeatability of a feature point is a key issue. Due to distortions of the SAR image and the optical image, a traditional geometric operator often fails to extract the repetitive feature point. Therefore, this embodiment of the present disclosure considers feature point extraction as a self-supervised task, and learns the repetitive feature point between the SAR image and the optical image through a neural network.

Figure 2:
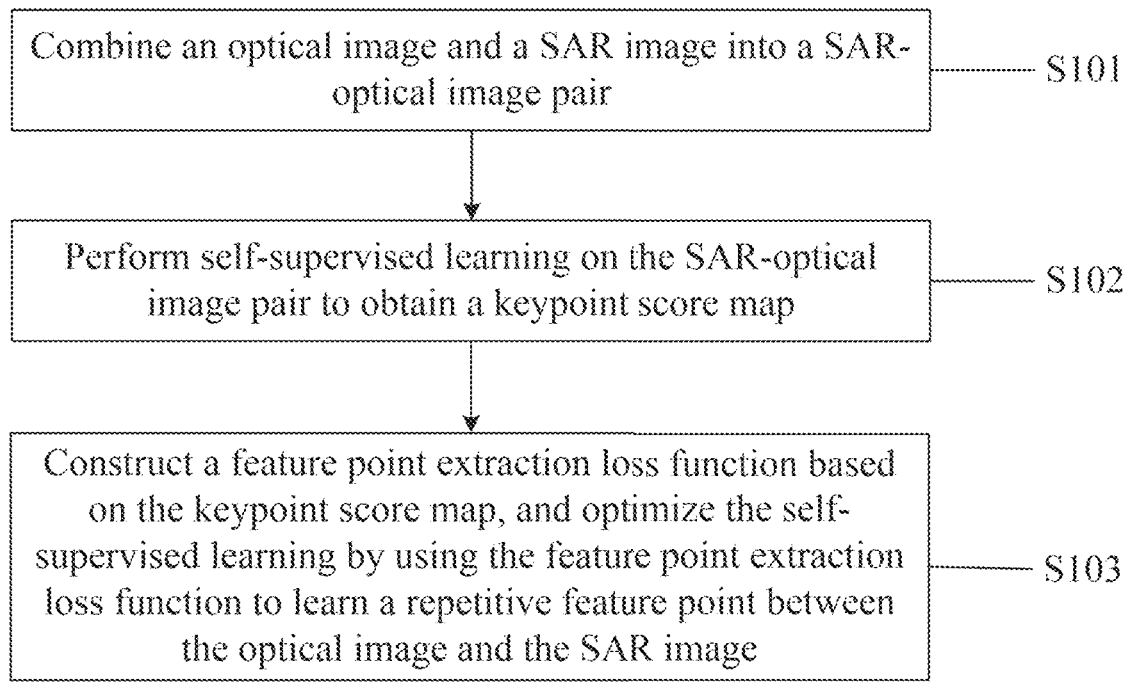
FIG. 2 is a schematic flowchart of performing self-supervised feature extraction on an optical image and a SAR image according to an embodiment of the present disclosure.

Further, in a specific embodiment, as shown in FIG. 2, the step S1 includes the following sub-steps:

S101: Combine the optical image and the SAR image into a SAR-optical image pair.

S102: Perform self-supervised learning on the SAR-optical image pair to obtain a keypoint score map.

Specifically, a fully convolutional network is used as a backbone network to perform the self-supervised learning on the SAR-optical image pair to obtain the keypoint score map. A local maximum point in the keypoint score map is selected as a keypoint.

S103: Construct a feature point extraction loss function based on the keypoint score map, and optimize the self-supervised learning by using the feature point extraction loss function to learn the repetitive feature point between the optical image and the SAR image.

In order to learn a sparse repetitive feature point and obtain a more effective feature point based on a matching relationship between the SAR image and the optical image, this embodiment proposes three new feature point extraction loss functions to optimize the self-supervised learning.

Figure 3:
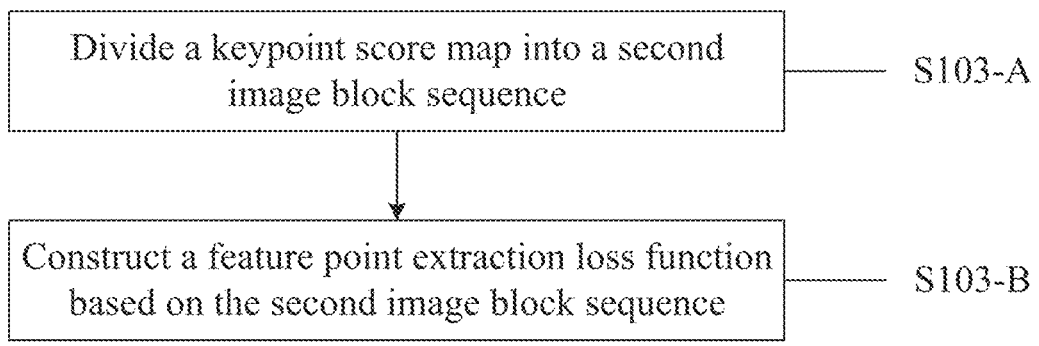
FIG. 3 is a schematic flowchart of constructing a feature point extraction loss function based on a keypoint score map according to an embodiment of the present disclosure.

Further, in a specific embodiment, as shown in FIG. 3, the constructing a feature point extraction loss function based on the keypoint score map in the step S103 includes the following sub-steps:

S103-A: Divide the keypoint score map into a second image block sequence.

Specifically, in a training phase, a SAR-optical image pair $\{I_s, I_o\}$ with a known transformation relationship of U is input into the fully convolutional network. After preprocessing, a keypoint score map $\{Score_sU, Score_o\}$ is obtained through the self-supervised learning. The $Score_sU$ is a keypoint score map obtained by performing the known transformation U on $Score_s$. An objective of this embodiment is to obtain a common salient feature of heterologous images, and therefore it is desired that the output $Score_sU$ and $Score_o$ are consistent, in other words, all local maximum points of the $Score_o$ correspond to all local maximum points of the $Score_sU$. A measure taken in this embodiment is to maximize an average cosine similarity of blocks between $Score_sU$ and $Score_o$. Therefore, the keypoint score map $\{Score_sU, Score_o\}$ is divided into an N×N second image block sequence. The second image block sequence includes a SAR image block sequence $Score_sU(i)(i=1 \ldots m)$ and an optical image block sequence $Score_o(i)(i=1 \ldots m)$.

S103-B: Construct the feature point extraction loss function based on the second image block sequence.

Specifically, the feature point extraction loss function includes a first loss function, a second loss function, and a third loss function.

The first loss function is represented by a following formula:

$$L_1(I_s, I_o, U) = 1 - \frac{1}{m}\sum_{i=1}^{m} \cos im(Score_o(i), Score_sU(i))$$

In the above formula, $I_s$ represents the SAR image, $I_o$ represents the optical image, U represents affine transformation, $Score_o(i)$ represents an $i^{th}$ image block of the optical image block sequence, $Score_sU(i)$ represents an $i^{th}$ image block of the SAR image block sequence, and m represents a quantity of image blocks in the second image block sequence. In addition, in order to enable each sub-block to learn a local maximum, the second loss function is constructed. The second loss function is represented by a following formula:

$$L_2(I) = 1 - \frac{1}{m}\sum_{i=1}^{m}(maxScore(i) - meanScore(i))$$

In the above formula, I represents the SAR-optical image pair, and Score(i) represents an $i^{th}$ image block of the second image block sequence.

The above first and second loss functions can learn a common repeatability feature between the heterologous images and obtain a uniformly distributed feature point, which is beneficial for feature matching.

The third loss function is used to enable the neural network to learn a keypoint that is easier to match. After the input SAR-optical image pair $\{I_s, I_o\} \in R^{W \times H}$ is preprocessed, a trained dual-branch network is used to extract a dense feature description vector $\{V_S, V_O\} \in R^{W*H \times 256}$. Then, a global metric, namely AP, is used to characterize a similarity between feature description vectors of pixels at corresponding positions of a heterologous image pair, and AP $AP_{ij}$ (i=1 ... H, j=1 ... W) corresponding to each pixel of the image is obtained. A larger value of the AP leads to a higher similarity between the feature description vectors. Therefore, in order to obtain the keypoint that is easier to match and remove an interference point in a flat or repetitive region, this embodiment constructs the third loss function. The third loss function is represented by a following formula:

$$L_3 = 1 - [AP_{ij}Score_{ij} + \gamma(1 - Score_{ij})]$$

In the above formula, $AP_{ij}$ represents AP corresponding to a pixel at an (i, j) position in the SAR-optical image pair, $Score_{ij}$ represents a score corresponding to the pixel at the (i, j) position in the SAR-optical image pair, and $\gamma \in [0,1]$ represents a hyperparameter, which represents a minimum expected value of the $AP_{ij}$.

When the $AP_{ij}$ at a corresponding position is less than $\gamma$, in order to minimize the $L_3$, the neural network learns that a score $Score_{ij}$ for the position should tend towards 0. Similarly, when the $AP_{ij}$ is greater than the $\gamma$, the $Score_{ij}$ should tend towards 1. Therefore, in order to enable the neural network to learn features that are easy to correctly match between the heterologous images, weighted summation is performed on the first loss function, the second loss function, and the third loss function. Through extensive experiments, it is determined that optimal weights are as follows: $\alpha=1$, $\beta=1$, and $\varphi=0.5$.

$$L_{detector} = \alpha L_1 + \beta L_2 + \phi L_3$$

Figure 4:
FIG. 4 is a schematic diagram of a result of extracting a repetitive feature point according to an embodiment of the present disclosure.

In this way, the feature point extraction loss function $L_{detector}$ is obtained. The self-supervised learning is optimized by using the feature point extraction loss function to learn the repetitive feature point between the optical image and the SAR image, as shown in FIG. 4.

It should be noted that before the step S1, the multimodal image matching method includes: converting the optical image and the SAR image into a normalized image by using a local normalization filter. Considering a nonlinear radiation distortion, this embodiment adopts the local normalization filter to preserve relevant detail information between images of two modalities, thereby improving matching performance.

Specifically, a mathematical definition of the local normalization filter is represented by a following formula:

$$I_{norm}(x, y) = I(x, y) - \frac{1}{|M(x, y, d)|}\sum_{M(x,y,d)} I(x, y)$$

Figure 5:
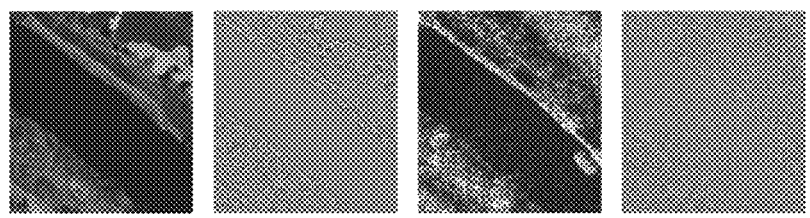
FIG. 5 is a schematic diagram of a local normalized filtering result according to an embodiment of the present disclosure.

In the above formula, $I(x,y)$ represents an original image, $I_{norm}(x,y)$ represents the normalized image, and $M(x, y, d)$ represents a local window with (x, y) as a center and (2*d+1×2*d+1) as a size. The local normalization filter is implemented by a difference between the original image and its average filtering result, and a purpose of the average filtering is to remove detailed structural information in the original image. Therefore, the local normalization filter preserves a detail component of the image, which helps to extract a common structural feature of the heterologous images. For a filtering result of the local normalization filter, reference can be made to FIG. 5.

S2: Segment the optical image and the SAR image into a first image block sequence based on the repetitive feature point, and perform feature extraction on the first image block sequence through a dual-branch network to obtain feature description vectors of the optical image and the SAR image respectively.

Figure 6:
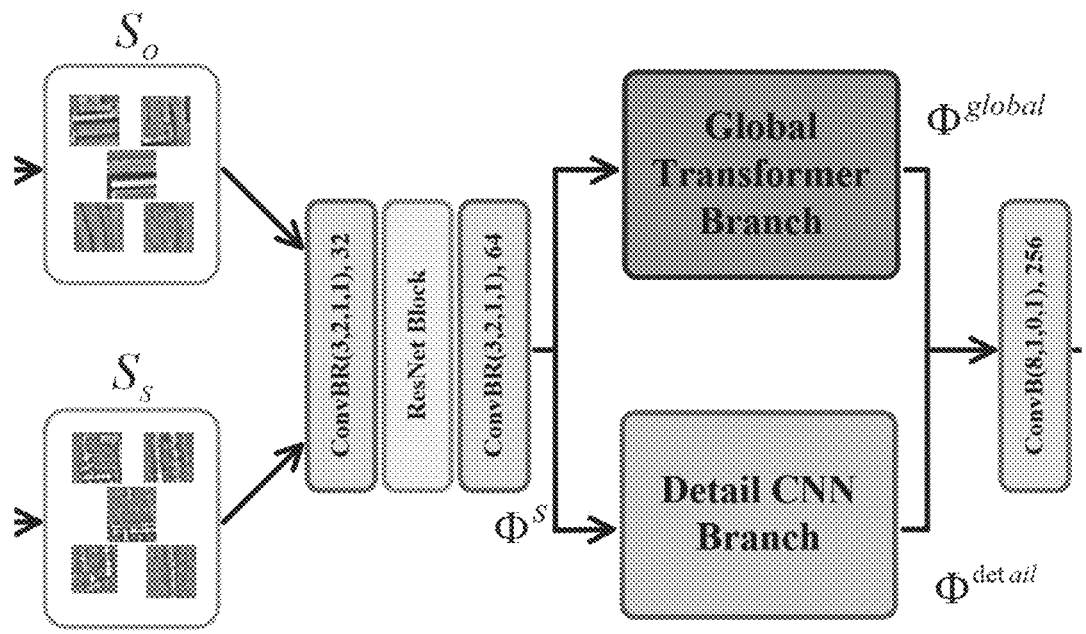
FIG. 6 is a schematic structural diagram of a dual-branch network according to an embodiment of the present disclosure.

In order to mine a multi-scale and multimodal image feature, as shown in FIG. 6, this embodiment proposes the dual-branch network. Specifically, the dual-branch network includes a first branch network Global Transformer Branch for extracting a global feature and a second branch network Detail CNN Branch for extracting a local feature. Further, the dual-branch network further includes a convolutional layer for extracting a shallow feature.

Figure 7:
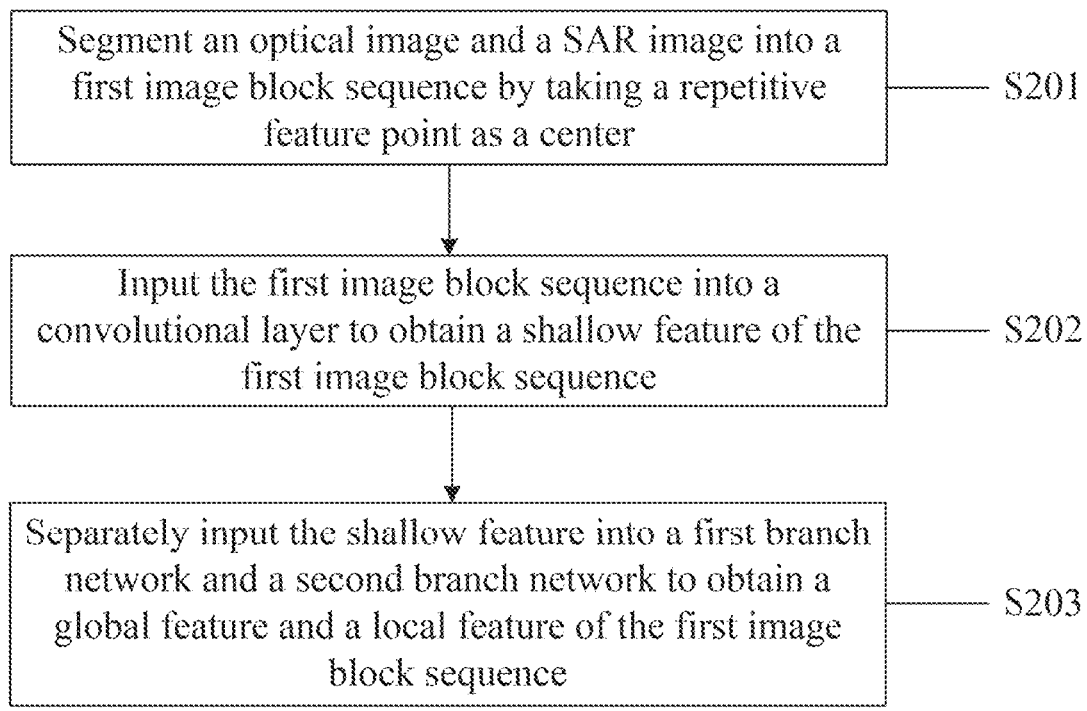
FIG. 7 is a schematic flowchart of feature extraction by a dual-branch network according to an embodiment of the present disclosure.

Further, in a specific embodiment, as shown in FIG. 7, the step S2 includes the following sub-steps:

S201: Segment the optical image and the SAR image into the first image block sequence by taking the repetitive feature point as a center.

Specifically, this embodiment segments the optical image and the SAR image into a 64×64 first image block sequence by taking the extracted repetitive feature point as the center S202: Input the first image block sequence into the convolutional layer to obtain a shallow feature of the first image block sequence.

Specifically, as shown in FIG. 6, the convolutional layer is constituted by two two-dimensional (2D) convolutional layers ConvBR (with a 3×3 convolution kernel, a stride of 2, and a padding size of 1) and a ResNet block. The 64×64 first image block sequence is taken as an input to obtain the shallow feature $\{\Phi_S^S, \Phi_O^S\} \in R^{16\times16\times64}$ of the first image block sequence through the convolutional layer. A mathematical expression is represented by a following formula:

$\Phi_S^S$=ConvBR(RES(ConvBR($S_s^i$))),$\Phi_O^S$=ConvBR(RES(ConvBR($S_o^i$))) ConvBR(I)=bn(relu(conv(I)), RES(I)=(bn(relu(conv(I)))+I S203: Separately input the shallow feature into the first branch network and the second branch network to obtain a global feature and a local feature of the first image block sequence.

Figure 8:
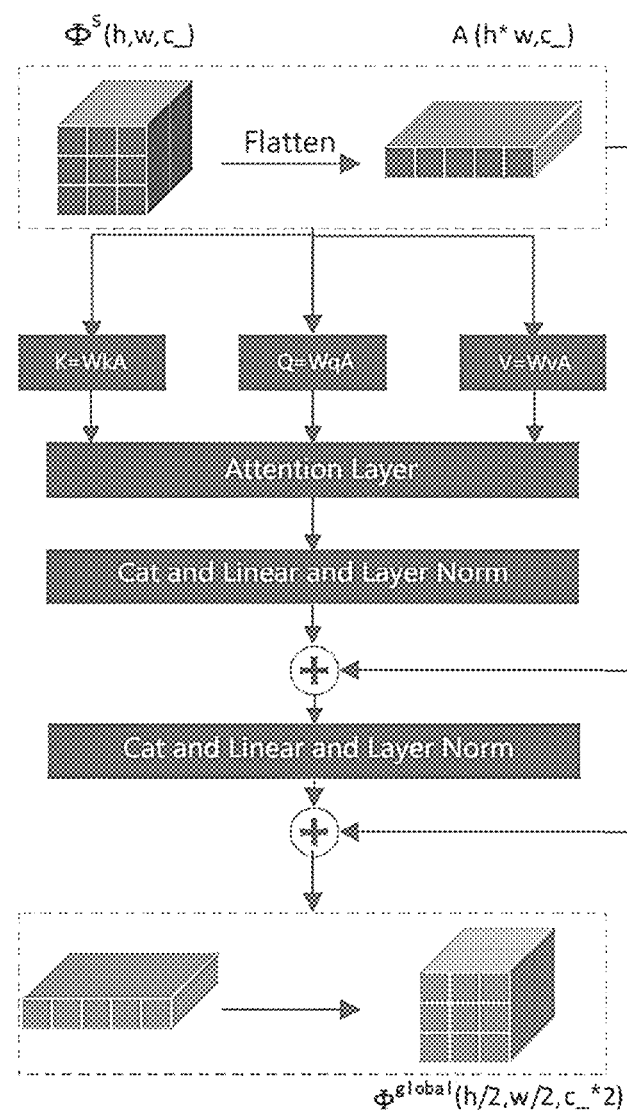
FIG. 8 is a schematic structural diagram of a first branch network according to an embodiment of the present disclosure.

Based on an excellent global context information extraction capability of a transformer, the first branch network in this embodiment includes a lite-transformer, a full connection layer, and a normalization layer. This embodiment uses a spatial self-attention mechanism of the transformer to construct the first branch network, specifically as shown in FIG. 8. In a self-attention mechanism, the input shallow feature is first flattened into a series of feature vectors $A \in R^{h*w\times c}$—by pixel, where c represents a quantity of dimensions of the feature vector. Then, a transfer matrix $\{W^q, W^k, W^v\}$ is used to generate a corresponding triplet (query, key, value), namely (Q, K, V), which is mathematically expressed by using a following formula:

$$\begin{cases} Q = W^q A \\ K = W^k A \\ V = W^v A \end{cases}$$

The generated triplet is then input into an attention layer: A weighted inner product E of the K and the Q is calculated, and a corresponding weight is obtained through a softmax function. The weighted summation is performed on the obtained weight and the V to obtain a final attention feature vector B. The E and the B are specifically represented by following formulas:

$$E = \frac{K^T \cdot Q}{\sqrt{d}}$$

$$B = \text{attention}(E, V) = V \cdot \text{softmax}(E)$$

Finally, a global feature $\{\Phi_S^{global}, \Phi_O^{global}\} \in R^{8\times8\times128}$ of the first image block sequence is obtained through a series of full connection layers and layer normalization. Considering a balance between performance and computational efficiency, this embodiment adopts an LT-block as a basic unit of the first branch network.

Figure 9:
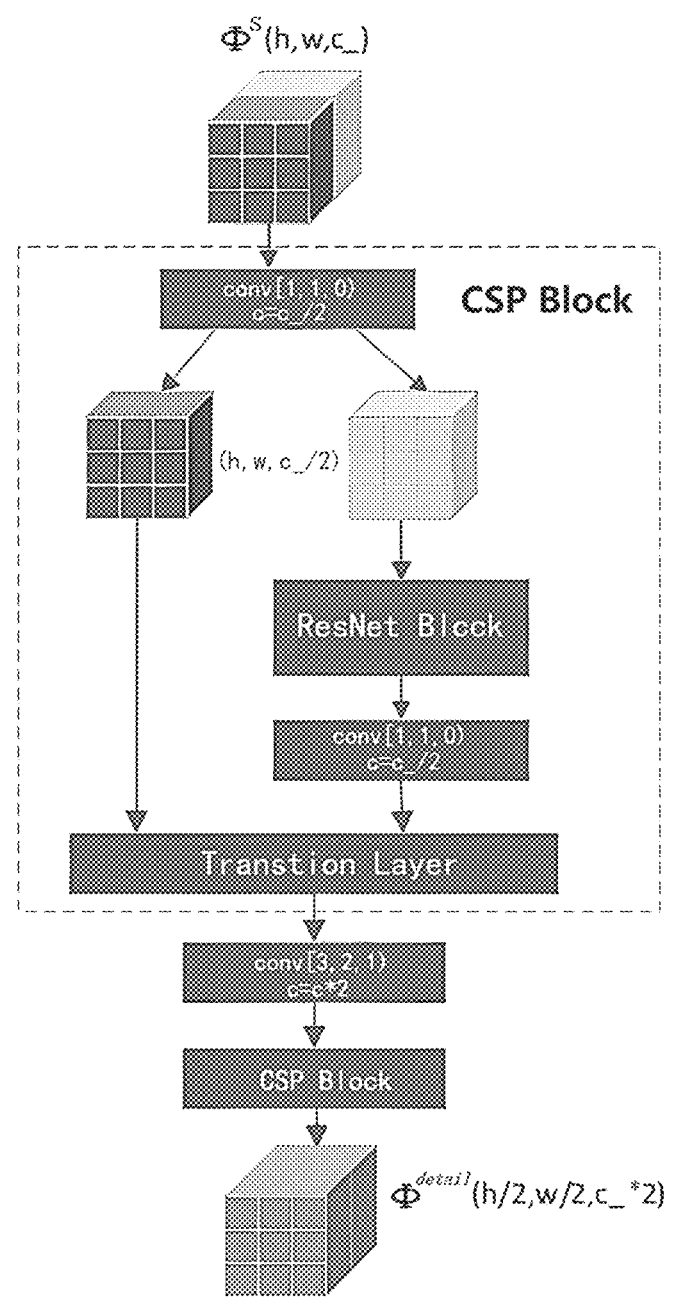
FIG. 9 is a schematic structural diagram of a second branch network according to an embodiment of the present disclosure.

Further, the second branch network in this embodiment includes a first CSP module, a connection layer, and a second CSP module. The second branch network adopts a CSP-Resnet as a backbone network, specifically as shown in FIG. 9. The first CSP module maps the input shallow feature into two parts along a channel dimension by using a 1×1 convolutional layer. For one part, local information is extracted through a conventional ResNet block, and the other part is directly concatenated with the former output and then inputted into a transition layer. The transition layer contains a batch normalization layer, a ReLu activation layer, and a 1×1 convolutional layer. The second branch network includes two CSP-ResNet blocks, and the connection layer expands a quantity of channel dimensions through 3×3 convolution, whereby an 8×8×128 local feature $\{\Phi_S^{detail}, \Phi_O^{detail}\} \in R^{8\times8\times128}$ is obtained.

It can be understood that as shown in FIG. 9, a $1^{st}$ CSP block is the first CSP module, and a $2^{nd}$ CSP block is the second CSP module. Working principles of the second CSP module and the first CSP module are the same, which have been described earlier and are not repeated herein again.

S204: Perform concatenation and convolution on the global feature and the local feature to obtain the feature description vector of the first image block sequence.

Specifically, the global feature $\Phi^{global}$ and the local feature $\Phi^{detail}$ are concatenated, and a final feature description vector $\{V_S, V_O\} \in R^{1\times256}$ is obtained through a convolutional layer with a 3×3 filter and a convolutional layer with an 8×8 filter. Each convolutional layer is activated through batch normalization and a rectified linear unit (ReLu).

It should be noted that in order to optimize the dual-branch network, this embodiment designs a feature description loss function named hard distance loss for training a dual-branch feature description network. The hard distance loss function aims to enable corresponding networks of matching image blocks corresponding to the SAR image and the optical image to output feature description vectors, in other words, minimize a relative distance between positive samples $\{V_S^i, V_O^i\}$ and increase a relative distance between negative samples $\{V_S^i, V_O^j\}$. For each pair of matching SAR and optical images, n−1 negative samples are sampled, a relative distance $d(V_S^i, V_O^j)$, $\{i=1, \ldots, n; j=1 \ldots n\}$ between corresponding images of all positive and negative samples is calculated, and a negative sample $\{V_{S_{min}}^{jo}\{V, V_{O_{min}}^k(i \neq j, i \neq k)$ with a minimum relative distance is selected to form triplets $(V_S^i, V_O^i, V_{S_{min}}^j)$ and $(V_S^i, V_O^i, V_{O_{min}}^k)$ with the positive sample $\{V_S^i, V_O^i\}$. Specifically, the feature description loss function used to train the dual-branch feature description network is represented by a following formula:

$$L_{harddistance} = \frac{1}{n} \sum_{\substack{k_{S_{min}}^{jo}, i=1 \\ O_{min}}}^{n} \max(0, (1 + d(V_S^i, V_O^i)) - \min(d(V_S^i, V$$

S3: Perform the feature matching on the optical image and the SAR image based on the feature description vectors to obtain a matching point pair between the optical image and the SAR image.

Specifically, this embodiment utilizes an NN search method and a RANSAC method for the feature matching and feature matching pair purification.

Figure 10:
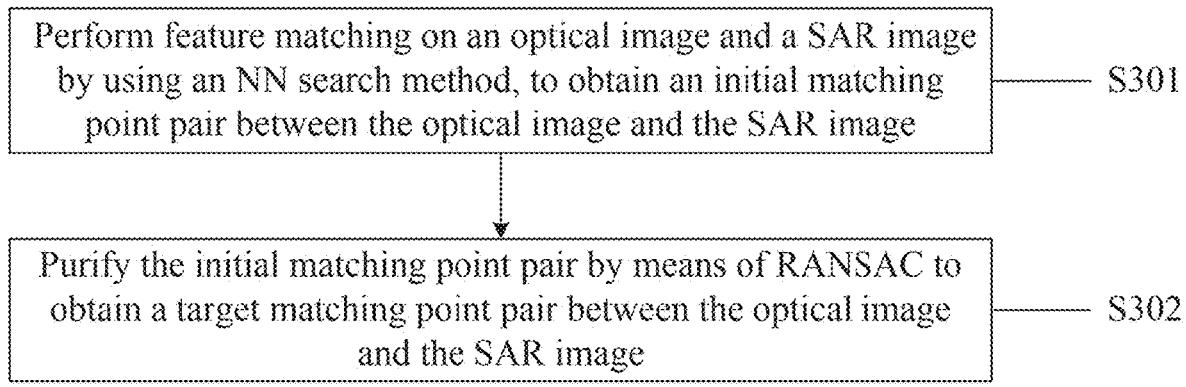
FIG. 10 is a schematic flowchart of performing feature matching on an optical image and a SAR image based on a feature description vector according to an embodiment of the present disclosure.

Further, in a specific embodiment, as shown in FIG. 10, the step S3 includes the following sub-steps:

S301: Perform the feature matching on the optical image and the SAR image by using the NN search method, to obtain an initial matching point pair between the optical image and the SAR image.

Specifically, a feature point in the SAR image and nearest and second nearest feature points in the optical image are searched for based on a Euclidean distance between the feature description vectors. A first threshold is preset to perform comparison with a ratio of a distance between feature description vectors corresponding to the feature point in the SAR image and the nearest and second nearest feature points in the optical image. If the ratio is greater than the first threshold, it indicates that the two feature points are not matched; otherwise, the two feature points are matched. Therefore, a quantity of matching points is adjusted by controlling the first threshold, which is beneficial for controlling precision of the keypoint.

S302: Purify the initial matching point pair by means of RANSAC to obtain a target matching point pair between the optical image and the SAR image.

Figure 11:
FIG. 11 is a schematic diagram of a feature matching result according to an embodiment of the present disclosure.

The RANSAC method can use an iterative approach to find an optimal parameter model in a dataset containing an "outlier". Specifically, in this embodiment, four sample matching pairs are randomly sampled from the initial matching point pair, and a transformation matrix H between images is calculated and denoted as a model M. Then a projection error between each matching point pair and the model M is calculated. If the projection error is less than a second threshold, the matching point pair is added to an interior point set I. If a quantity of elements in the interior point set I is greater than a quantity of elements in an optimal interior point set I_best, the I_best is updated to the I. In addition, an iteration quantity k is updated, and the above process is repeated to obtain an optimal transformation matrix to obtain a purified matching point pair. For a specific matching result, reference can be made to FIG. 11.

This embodiment of the present disclosure provides a multimodal image matching method. The multimodal image matching method has the following beneficial effects: A neural network is used to autonomously learn a region with strong matching between a SAR image and an optical image as a feature point. This has more advantages in extracting a repetitive feature point from heterologous images compared with a traditional geometric operator, effectively improving matching precision. A dual-branch network composed of a transformer-CNN joint framework is used to extract richer deep features shared by the heterologous SAR and optical images. This achieves a stronger anti-interference capability and better robustness compared with a traditional feature extraction method and a CNN-based method. A description then detection two-stage training method is adopted to link a feature detection module and a feature description module that are mutually isolated in a traditional feature-based matching method, whereby a matching relationship between the images constrains selection of the feature point to obtain a feature point more beneficial for matching.

Figure 12:
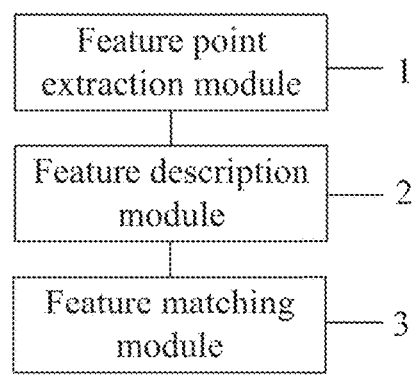
FIG. 12 is a schematic structural diagram of a multimodal image matching system according to an embodiment of the present disclosure.

Based on the above multimodal image matching method, as shown in FIG. 12, an embodiment of the present disclosure further provides a multimodal image matching system, including:

a feature point extraction module 1 configured to perform self-supervised feature extraction on an optical image and a SAR image to obtain a repetitive feature point between the optical image and the SAR image;

a feature description module 2 configured to segment the optical image and the SAR image into a first image block sequence based on the repetitive feature point, and perform feature extraction on the first image block sequence through a dual-branch network to obtain feature description vectors of the optical image and the SAR image respectively, where the dual-branch network includes a first branch network for extracting global feature and a second branch network for extracting a local feature; and a feature matching module 3 configured to perform feature matching on the optical image and the SAR image based on the feature description vectors to obtain a matching point pair between the optical image and the SAR image.

It should be noted that the modules of the multimodal image matching system may be implemented in whole or in part by software, hardware, or a combination thereof. The modules may be embedded in or independent of a processor of a computer device in a form of hardware, or stored in a memory of the computer device in a form of software, whereby the processor can easily invoke and execute corresponding operations of the modules. For a specific limitation on the multimodal image matching system, reference can be made to the limitation on the multimodal image matching method described in the above context. Both the limitation on the multimodal image matching system and the limitation on the multimodal image matching method have a same function and role, and details are not described herein again.

An embodiment of the present disclosure further provides a terminal device, including:

a processor, a memory, and a bus.

The bus is configured to connect the processor and the memory.

The memory is configured to store an operation instruction.

The processor is configured to invoke and execute the operation instruction to perform operations corresponding to the multimodal image matching method in the present disclosure.

Figure 13:
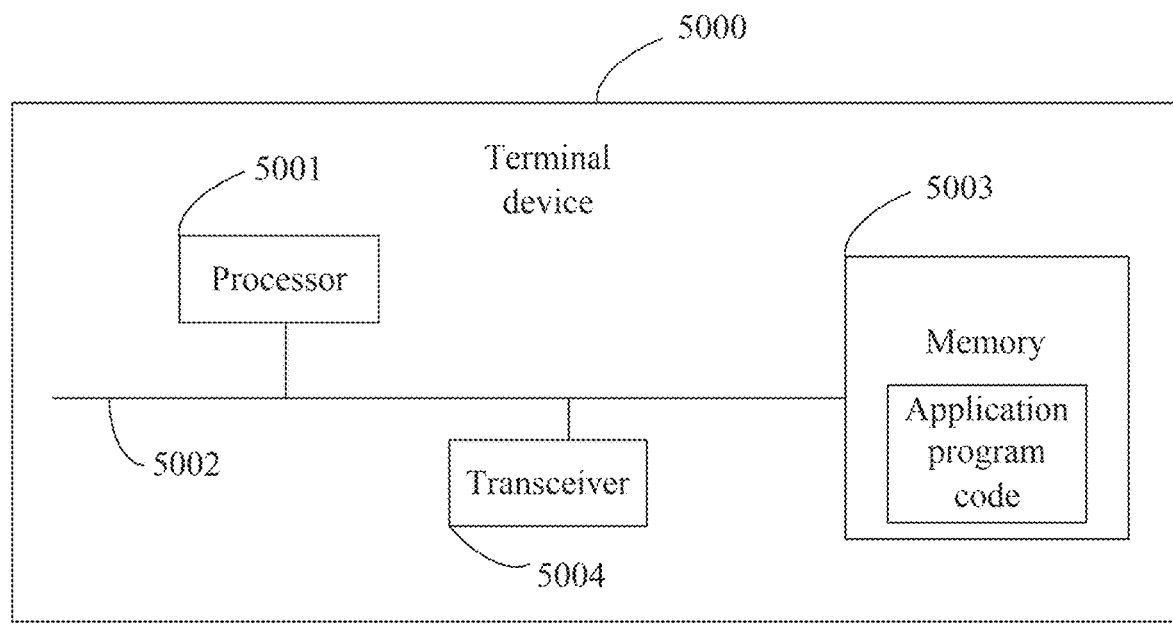
FIG. 13 is a schematic structural diagram of a terminal device according to an embodiment of the present disclosure.

In an optional embodiment, a terminal device is provided, as shown in FIG. 13. The terminal device 5000 shown in FIG. 13 includes a processor 5001 and a memory 5003. The processor 5001 is connected to the memory 5003, for example, through a bus 5002. Optionally, the terminal device 5000 may further include a transceiver 5004. It should be noted that a practical application is not limited to one transceiver 5004, and a structure of the terminal device 5000 does not constitute a limitation on the embodiments of the present disclosure.

The processor 5001 may be a central processing unit (CPU), a general-purpose processor, a digital signal processor (DSP), an application specific integrated circuit (ASIC), a field programmable gate array (FPGA) or another programmable logic device, a transistor logic device, a hardware component, or any combination thereof. The processor 5001 can implement or execute example logical block diagrams, modules, and circuits that are described with reference to the content disclosed in the present disclosure. The processor 5001 may alternatively be a combination for implementing a computing function, for example, a combination including one or more microprocessors, or a combination of the DSP and the microprocessor.

The bus 5002 may include a pathway for transmitting information between the aforementioned components. The bus 5002 may be a peripheral component interconnect (PCI) bus, an extended industry standard architecture (EISA) bus, or the like. The bus 5002 may be classified into an address bus, a data bus, a control bus, and the like. For ease of representation, only one thick line is used to represent the bus in FIG. 13, but this does not mean that there is only one bus or only one type of bus.

The memory 5003 may be a read-only memory (ROM), another type of static storage device that can store static information and instructions, a random access memory (RAM), another type of dynamic storage device that can store information and instructions, an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, and the like), a disk storage medium or another magnetic storage device, or any other medium that can be used to carry or store desired program code in a form of an instruction or a data structure and can be accessed by a computer, but is not limited thereto.

The memory 5003 is configured to store application program code for executing the solutions of the present disclosure, and the execution is controlled by the processor 5001. The processor 5001 is configured to execute the application program code stored in the memory 5003 to implement the content shown in any one of the above method embodiments.

The terminal device includes but is not limited to mobile terminals such as a mobile phone, a laptop, a digital broadcast receiver, a personal digital assistant (PDA), a PAD (tablet computer), a portable multimedia player (PMP), a vehicle-mounted terminal (such as a vehicle-mounted navigation terminal), and fixed terminals such as a digital TV and a desktop computer.

An embodiment of the present disclosure further provides a computer-readable storage medium. The computer-readable storage medium stores a computer program. The computer program is executed by a processor to implement the multimodal image matching method in the present disclosure.

Another embodiment of the present disclosure provides a computer-readable storage medium. The computer-readable storage medium stores a computer program. When the computer program runs on a computer, the computer can execute the corresponding content in the foregoing method embodiments.

In addition, an embodiment of the present disclosure further provides a computer-readable storage medium. The computer-readable storage medium stores a computer program, and the computer program is executed by a processor to perform the steps of the above method.

In conclusion, the embodiments of the present disclosure provide a multimodal image matching method and system, a terminal device, and a storage medium. A neural network is used to autonomously learn a region with strong matching between a SAR image and an optical image as a feature point. This has more advantages in extracting a repetitive feature point from heterologous images compared with a traditional geometric operator, effectively improving matching precision. A dual-branch network composed of a transformer-CNN joint framework is used to extract richer deep features shared by the heterologous SAR and optical images. This achieves a stronger anti-interference capability and better robustness compared with a traditional feature extraction method and a CNN-based method. A description then detection two-stage training method is adopted to link a feature detection module and a feature description module that are mutually isolated in a traditional feature-based matching method, whereby a matching relationship between the images constrains selection of the feature point to obtain a feature point more beneficial for matching.

The embodiments in this specification are described in a progressive manner. For same or similar parts between the embodiments, reference may be made to each other. Each embodiment focuses on a difference from other embodiments. In particular, for a system embodiment, since it is basically similar to the method embodiment, the description is relatively simple, and reference can be made to the description of the method embodiment. It should be noted that the technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

The foregoing are merely descriptions of the preferred implementations of the present disclosure. It should be noted that several improvements and replacements can be made by a person of ordinary skill in the art without departing from the technical principle of the present disclosure, and these improvements and replacements shall also be deemed as falling within the protection scope of the present disclosure.

The invention claimed is:

1. A multimodal image matching method, comprising:
    performing self-supervised feature extraction on an optical image and a synthetic aperture radar (SAR) image to obtain a repetitive feature point between the optical image and the SAR image;
    segmenting the optical image and the SAR image into a first image block sequence based on the repetitive feature point, and performing feature extraction on the first image block sequence through a dual-branch network to obtain feature description vectors of the optical image and the SAR image respectively, wherein the dual-branch network comprises a first branch network for extracting a global feature and a second branch network for extracting a local feature; and
    performing feature matching on the optical image and the SAR image based on the feature description vectors to obtain a matching point pair between the optical image and the SAR image.

2. The multimodal image matching method according to claim 1, before the performing self-supervised feature extraction on an optical image and a SAR image, comprising:
converting the optical image and the SAR image into a normalized image by using a local normalization filter.

3. The multimodal image matching method according to claim 1, wherein the performing self-supervised feature extraction on an optical image and a SAR image to obtain a repetitive feature point between the optical image and the SAR image comprises:
combing the optical image and the SAR image into a SAR-optical image pair;
performing self-supervised learning on the SAR-optical image pair to obtain a keypoint score map; and
constructing a feature point extraction loss function based on the keypoint score map, and optimizing the self-supervised learning by using the feature point extraction loss function to learn the repetitive feature point between the optical image and the SAR image.

4. The multimodal image matching method according to claim 3, wherein the constructing a feature point extraction loss function based on the keypoint score map comprises:
dividing the keypoint score map into a second image block sequence, wherein the second image block sequence comprises a SAR image block sequence and an optical image block sequence;
constructing the feature point extraction loss function based on the second image block sequence, wherein the feature point extraction loss function comprises a first loss function, a second loss function, and a third loss function, wherein
the first loss function is represented by a following formula:

$$L_1(I_s, I_o, U) = 1 - \frac{1}{m}\sum_{i=1}^{m} \cos im(\text{Score}_o(i), \text{Score}_s U(i))$$

wherein $I_s$ represents the SAR image, $I_o$ represents the optical image, U represents affine transformation, $\text{Score}_o(i)$ represents an $i^{th}$ image block of the optical image block sequence, $\text{Score}_s U(i)$ represents an $i^{th}$ image block of the SAR image block sequence, and m represents a quantity of image blocks in the second image block sequence;
the second loss function is represented by a following formula:

$$L_2(I) = 1 - \frac{1}{m}\sum_{i=1}^{m}(maxScore(i) - meanScore(i))$$

wherein I represents the SAR-optical image pair, and Score(i) represents an $i^{th}$ image block of the second image block sequence; and
the third loss function is represented by a following formula:

$$L_3 = 1 - [AP_{ij}\text{Score}_{ij} + \gamma(1 - \text{Score}_{ij})]$$

wherein $AP_{ij}$ represents average precision (AP) corresponding to a pixel at an (i, j) position in the SAR-optical image pair, $\text{Score}_{ij}$ represents a score corresponding to the pixel at the (i, j) position in the SAR-optical image pair, and $\gamma$ represents a hyperparameter; and the AP represents a degree of similarity between feature description vectors of pixels at corresponding positions in the SAR-optical image pair; and
performing weighted summation on the first loss function, the second loss function, and the third loss function to obtain the feature point extraction loss function.

5. The multimodal image matching method according to claim 1, wherein the dual-branch network further comprises a convolutional layer for extracting a shallow feature; and
the segmenting the optical image and the SAR image into a first image block sequence based on the repetitive feature point, and performing feature extraction on the first image block sequence through a dual-branch network to obtain feature description vectors of the optical image and the SAR image respectively comprises:
segmenting the optical image and the SAR image into the first image block sequence by taking the repetitive feature point as a center;
inputting the first image block sequence into the convolutional layer to obtain a shallow feature of the first image block sequence;
separately inputting the shallow feature into the first branch network and the second branch network to obtain a global feature and a local feature of the first image block sequence; and
performing concatenation and convolution on the global feature and the local feature to obtain a feature description vector of the first image block sequence.

6. The multimodal image matching method according to claim 5, wherein the first branch network comprises a lite-transformer, a full connection layer, and a normalization layer, and the second branch network comprises a first Cross Stage Partial (CSP) module, a connection layer, and a second CSP module.

7. The multimodal image matching method according to claim 1, wherein the performing feature matching on the optical image and the SAR image based on the feature description vectors to obtain a matching point pair between the optical image and the SAR image comprises:
performing the feature matching on the optical image and the SAR image by using a nearest neighbor (NN) search method, to obtain an initial matching point pair between the optical image and the SAR image; and
purifying the initial matching point pair by means of random sample consensus (RANSAC) to obtain a target matching point pair between the optical image and the SAR image.

8. A terminal device, comprising a processor, a memory, and a computer program stored in the memory and configured to be executed by the processor, wherein the processor executes the computer program to implement the multimodal image matching method according to claim 1.

9. A terminal device, comprising a processor, a memory, and a computer program stored in the memory and configured to be executed by the processor, wherein the processor executes the computer program to implement the multimodal image matching method according to claim 2.

10. A terminal device, comprising a processor, a memory, and a computer program stored in the memory and configured to be executed by the processor, wherein the processor executes the computer program to implement the multimodal image matching method according to claim 3.

11. A terminal device, comprising a processor, a memory, and a computer program stored in the memory and configured to be executed by the processor, wherein the processor executes the computer program to implement the multimodal image matching method according to claim 4.

12. A terminal device, comprising a processor, a memory, and a computer program stored in the memory and configured to be executed by the processor, wherein the processor executes the computer program to implement the multimodal image matching method according to claim 5.

13. A terminal device, comprising a processor, a memory, and a computer program stored in the memory and configured to be executed by the processor, wherein the processor executes the computer program to implement the multimodal image matching method according to claim 6.

14. A terminal device, comprising a processor, a memory, and a computer program stored in the memory and configured to be executed by the processor, wherein the processor executes the computer program to implement the multimodal image matching method according to claim 7.

15. A non-transitory computer-readable storage medium, wherein the computer-readable storage medium comprises a stored computer program, and the computer program is run to control a device at which the computer-readable storage medium is located to implement the multimodal image matching method according to claim 1.

16. A non-transitory computer-readable storage medium, wherein the computer-readable storage medium comprises a stored computer program, and the computer program is run to control a device at which the computer-readable storage medium is located to implement the multimodal image matching method according to claim 2.

17. A non-transitory computer-readable storage medium, wherein the computer-readable storage medium comprises a stored computer program, and the computer program is run to control a device at which the computer-readable storage medium is located to implement the multimodal image matching method according to claim 3.

18. A non-transitory computer-readable storage medium, wherein the computer-readable storage medium comprises a stored computer program, and the computer program is run to control a device at which the computer-readable storage medium is located to implement the multimodal image matching method according to claim 4.

19. A non-transitory computer-readable storage medium, wherein the computer-readable storage medium comprises a stored computer program, and the computer program is run to control a device at which the computer-readable storage medium is located to implement the multimodal image matching method according to claim 5.

20. A multimodal image matching system, comprising:
   a feature point extraction module configured to perform self-supervised feature extraction on an optical image and a SAR image to obtain a repetitive feature point between the optical image and the SAR image;
   a feature description module configured to segment the optical image and the SAR image into a first image block sequence based on the repetitive feature point, and perform feature extraction on the first image block sequence through a dual-branch network to obtain feature description vectors of the optical image and the SAR image respectively, wherein the dual-branch network comprises a first branch network for extracting a global feature and a second branch network for extracting a local feature; and
   a feature matching module configured to perform feature matching on the optical image and the SAR image based on the feature description vectors to obtain a matching point pair between the optical image and the SAR image.

\* \* \* \* \*